(12) United States Patent
Andreopoulos et al.

(10) Patent No.: US 10,650,309 B2
(45) Date of Patent: May 12, 2020

(54) HIGH DYNAMIC RANGE, HIGH CLASS COUNT, HIGH INPUT RATE WINNER-TAKE-ALL ON NEUROMORPHIC HARDWARE

(71) Applicant: INTERNATIONAL BUSINESS MACHINES CORPORATION, Armonk, NY (US)

(72) Inventors: Alexander Andreopoulos, San Jose, CA (US); Steven K. Esser, San Jose, CA (US); Jeffrey A. Kusnitz, Campbell, CA (US)

(73) Assignee: INTERNATIONAL MACHINES CORPORATION, Armonk, NY (US)

(*) Notice: Subject to any disclaimer, the term of this patent is extended or adjusted under 35 U.S.C. 154(b) by 701 days.

(21) Appl. No.: 15/232,370

(22) Filed: Aug. 9, 2016

(65) Prior Publication Data
US 2018/0046904 A1    Feb. 15, 2018

(51) Int. Cl.
*G06N 3/063* (2006.01)
*G06N 3/04* (2006.01)

(52) U.S. Cl.
CPC ............ *G06N 3/063* (2013.01); *G06N 3/049* (2013.01); *G06N 3/0454* (2013.01)

(58) Field of Classification Search
CPC ....... G06N 3/063; G06N 3/0454; G06N 3/049
See application file for complete search history.

(56) References Cited

U.S. PATENT DOCUMENTS

| | | | | |
|---|---|---|---|---|
| 6,038,267 A | * | 3/2000 | Oura | ............... H04L 1/06 329/304 |
| 2010/0277232 A1 | * | 11/2010 | Snider | ............... G06N 3/063 327/565 |
| 2012/0109863 A1 | | 5/2012 | Esser et al. | |
| 2015/0106310 A1 | | 4/2015 | Birdwell et al. | |
| 2016/0365870 A1 | * | 12/2016 | Huang | ............... H03M 3/37 |

OTHER PUBLICATIONS

American Heritage Dictionary Entry: histogram. The American Heritage Dictionary of English Language, https://www.andictionary.com/word/search.html?q=histogram. Accessed Feb. 28, 2019 (Year: 2019).*
Oster, Matthias Ferdinand, "Spike-Based Winner-Take-All Computation in a Multi-Chip Vision System," PhD Diss., Technische Wissenschaften, Eidgenössische Technische Hochschule ETH Zürich, Nr. 16896, 2006, 202 pages.
Esser, Steven K, et al., "Cognitive Computing Systems: Algorithms and Applications for Networks of Neurosynaptic Cores," The 2013 International Joint Conference on Neural Networks (IJCNN), pp. 1-10, IEEE, 2013.

* cited by examiner

*Primary Examiner* — Vincent Gonzales
(74) *Attorney, Agent, or Firm* — Erik Huestis; Stephen Kenny; Foley Hoag, LLP (57) ABSTRACT

High dynamic range, high class count, high input rate winner-take-all on neuromorphic hardware is provided. In some embodiments, a plurality of thermometer codes are received by a neurosynaptic core. The plurality of thermometer codes are split into a plurality of intervals. One of the plurality of intervals is selected. A local maximum is determined within the one of the plurality of intervals. A global maximum is determined based on the local maximum.

20 Claims, 9 Drawing Sheets

HIGH DYNAMIC RANGE, HIGH CLASS COUNT, HIGH INPUT RATE WINNER-TAKE-ALL ON NEUROMORPHIC HARDWARE

This invention was made with Government support under contract number HR0011-09-C-0002 awarded by the Defense Advanced Research Projects Agency (DARPA). The Government has certain rights to this invention.

BACKGROUND

Embodiments of the present invention relate to winner-take-all components in neuromorphic systems, and more specifically, to high dynamic range, high class count, high input rate winner-take-all on neuromorphic hardware.

BRIEF SUMMARY

According to embodiments of the present disclosure, a method of and computer program product for winner-take-all are provided. A plurality of thermometer codes are received by a neurosynaptic core. The plurality of thermometer codes are split into a plurality of intervals. One of the plurality of intervals is selected. A local maximum is determined within the one of the plurality of intervals. A global maximum is determined based on the local maximum.

In some embodiments of the present disclosure, a neuromorphic system is provided. The neurosynaptic system includes a first corelet. The first corelet is adapted to receive a plurality of thermometer codes, split the plurality of thermometer codes into a plurality of intervals, and select one of the plurality of intervals. The neurosynaptic system also includes a second corelet. The second corelet is adapted to receive the one of the plurality of intervals, determine a local maximum within the one of the plurality of intervals, and determine a global maximum based on the local maximum.

DETAILED DESCRIPTION

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar. In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In the theory of artificial neural networks, winner-take-all mechanisms refer to competitive learning neural circuits that can mutually inhibit or excite each other so that in the end the single output neuron that produces a spike, corresponds to the set of input neurons with the highest (or lowest) input activation under some particular metric. The closest equivalent mathematical formalism is the argmax/argmin operation which returns an index from an ordered set of numbers, corresponding to the number with the highest/smallest value. For example, given an ordered set X=(1,4,2,10,2), then argmax(X)=4 because the fourth index with value 10 is the maximum value in X. Winner-take-all (WTA) mechanisms are useful in models of vision or in attention models, to determine the winning class from a set of competing classes or to model the scene location where an active vision system should foveate to next, by determining the most salient position in a saliency map. For example, in object recognition systems, a winner take all mechanism is useful to denote the object present in an image by finding the hypothesis corresponding to the object class with the highest activation. In a saliency/attention system, a winner take all mechanism is useful to denote the object present in an image, by finding the hypothesis corresponding to the object class with the highest activation. In a saliency/attention system, a winner take all mechanism is useful to denote the most salient location in an image, that should be attended to next.

Biederman hypothesized that the human visual system is capable of discriminating amongst 30,000 different object classes, as this is number of nouns in the English language. Others put the number of classes that the human visual system can discriminate amongst in the millions, since the visual system is capable of effortlessly discriminating between sub-categories of objects that may be assigned the same noun. Object recognition benchmarks in the computer vision community such as imagenet contain thousands of classes, and require mechanisms for dealing with the classification of thousands of classes.

However, as the class count increases, it leads to a commensurate increase in the dynamic range associated with each class hypothesis. In other words, as the number of object classes increases, the dynamic range associated with each class must be increased. For example, given an object recognition system capable of discriminating amongst 10 classes, a dynamic range of 100 spikes may be sufficient to discriminate between the classes. As used herein, the dynamic range refers to the maximum total number of spikes that a group of neurons may produce. However, to discriminate amongst 1,000 classes, a 100 spike dynamic range makes the construction of a recognition system much more difficult, because the overwhelming majority of classes must produce 0 spikes if there are to be any spikes left to be associated with the winning class. For example, in the case of a variant of the backpropagation algorithm suitable for efficient neuromorphic hardware, the overwhelming majority of classes produces at least one output spike per frame, requiring a high dynamic range WTA mechanism. The human visual system is benchmarked at being capable of classifying images at up to 10 frames per second, without foveation, while typical video frame rates are even higher at 30 frames per second. Thus, real time performance is also desirable.

Each neuron in the human brain is estimated to have an average axon fan-out of up to 10,000, while each neuron spikes at no more than 100-300 Hz. In neuromorphic hardware, such as the TrueNorth architecture, neurosynaptic cores have dimension 256×256, take input from up to 256 axons, and have 256 neurons capable of producing output spikes at up to 1000 spikes per second. This presents a challenge to construct a high-dynamic-range, high-class-count high-input-rate WTA mechanism, because it is difficult to represent all classes in one core and to insert in the core all the input spikes quickly enough. In the case of an exemplary backpropagation-based algorithm, one WTA operation may be required per tick, where thousands of spikes are produced simultaneously at the same tick and for each input frame. Moreover, hybrid systems requiring the interaction of neuromorphic hardware and von-Neumann architectures is bottlenecked by the output bandwidth at the interface of the neuromorphic algorithm's output and the input of the von Neumann architecture. A neuromorphic/spiking-based WTA mechanism offers a way of drastically limiting the output bandwidth associated with a WTA mechanism to a single output spike per frame, even when there are thousands of classes associated with the system.

Accordingly, the present disclosure provides a WTA mechanism that addresses these problems. The validity of solutions according to the present disclosure is proven rigorously via mathematical induction. Embodiments of the present disclosure may be implemented in neuromorphic hardware or via a corelet implementation on TrueNorth.

Figure 1:
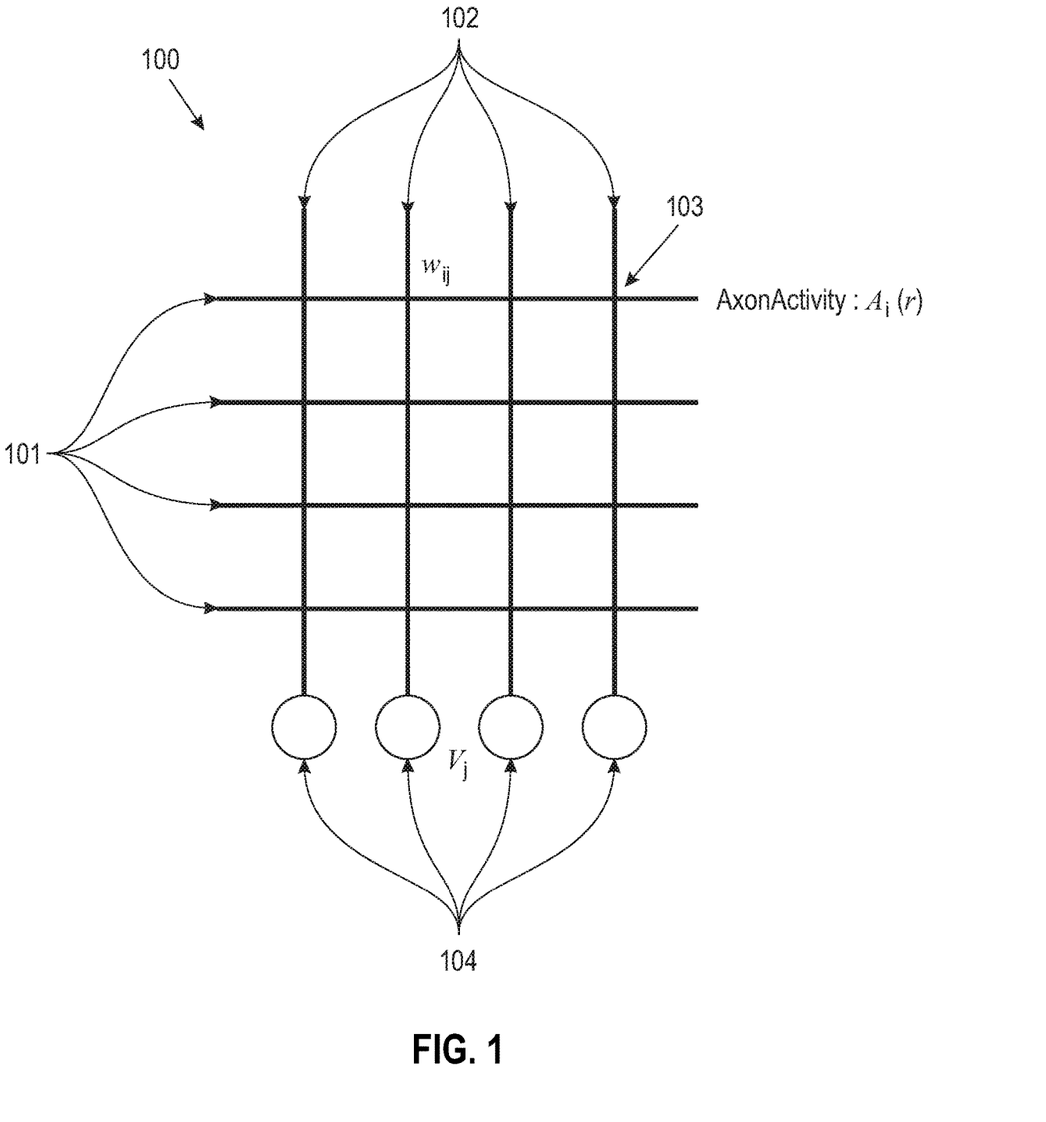
FIG. 1 depicts a neurosynaptic core according to embodiments of the present disclosure.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 synapses, 256 axons, and 256 neurons. In such embodiments, there are 256×256=65,536 synapses. Information flows from axons 101 to the neurons 104, modulated by the synapses 103.

Figure 2:
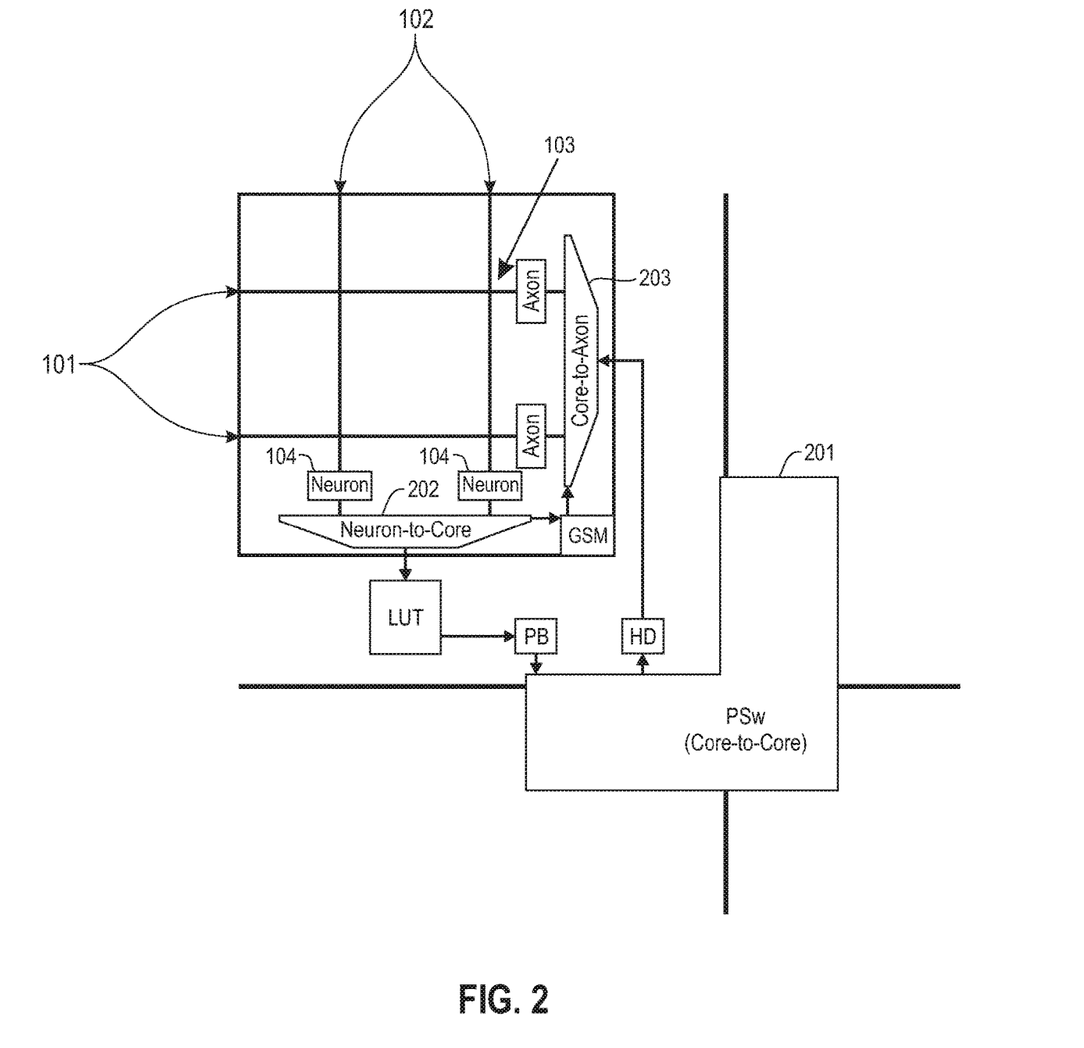
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are physical. Long-distance connectivity is logical. An exemplary embodiment is depicted in FIG. 2. Mesh router 201 provides communication between cores. Also on a given core, neuron to core 202 and core to axon 203 communication links are provided.

Figure 3:
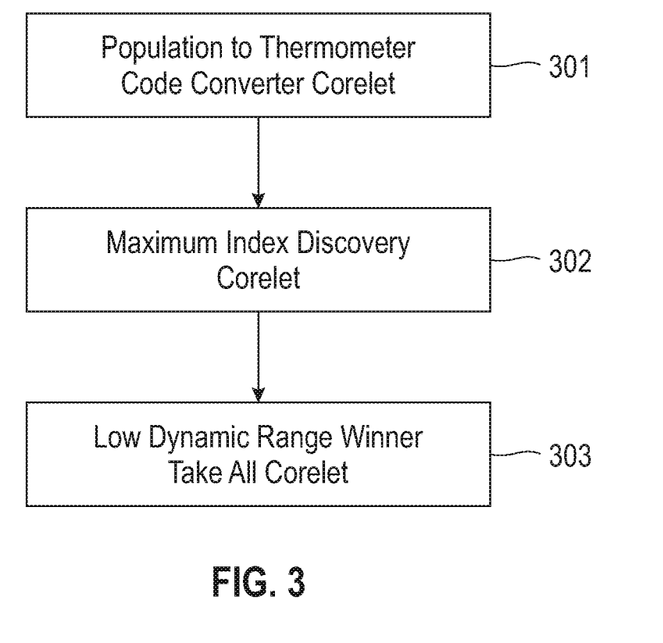
FIG. 3 depicts an overview of a corelet architecture according to embodiments of the present disclosure.

Referring now to FIG. 3, an exemplary system according to embodiments of the present disclosure is illustrated. The system consists of a population to thermometer code converter corelet 301, a maximum index discovery corelet 302, and a low dynamic range winner take all corelet 303. Corelet 301 converts Population code to thermometer code. Corelet 302 discretizes the thermometer code's range into non-overlapping contiguous intervals and finds the sub-interval in the thermometer code (usually, but not always, containing the absolute peak of the thermometer code) where a local low dynamic range winner take all can be applied to find the global winner take all. Corelet 303 extracts the sub-thermometer codes lying within this peak interval and finds the class ID with the highest sub-thermometer code through a low dynamic range winner take all mechanism.

Set forth below are definitions sufficient to prove the correctness of the algorithms provided herein. Also set forth below, is an exemplary implementation on TrueNorth. In this exemplary implementation, each core has 256 input axons and output neurons, making it non-trivial to solve the winner-take-all problem when the number of input spikes for each class can be large (in the tens or hundreds of thousands) and the number of input classes can also be large (in the thousands). TrueNorth imposes the additional constraint that the spiking TrueNorth compatible network must find the solution at the same rate at which the inputs enter (if a new input enters every single tick, then the winner take all mechanism must also be capable of outputting one solution per tick). Additional embodiment of algorithms according to the present disclosure are provided on neurosynaptic hardware.

A thermometer code T with domain $D_n = \{1, \ldots, n\}$ is a function $T: D_n \rightarrow \{0,1\}$ that satisfies the condition that for any i such that $T(i)=1$ then $T(j)=1$ for all $j<i$ as well.

In other words, in a thermometer code there is at most a single interval of indices, starting from index 1, that is assigned by function T a value of 1. In the case of corelets, the domain of T provides a representation for the indices of a connector's pins, and a value of 1 for $T(i)$ denotes an input spike along input pin i. Thus, an input connector takes as input a thermometer code if any set of input spikes that enter the corelet at any tick t, enter via a set of consecutive input pins, starting from pin 1. An input consisting of no spikes (i.e $T(i)=0$ for all i) is also a thermometer code.

Figure 4:
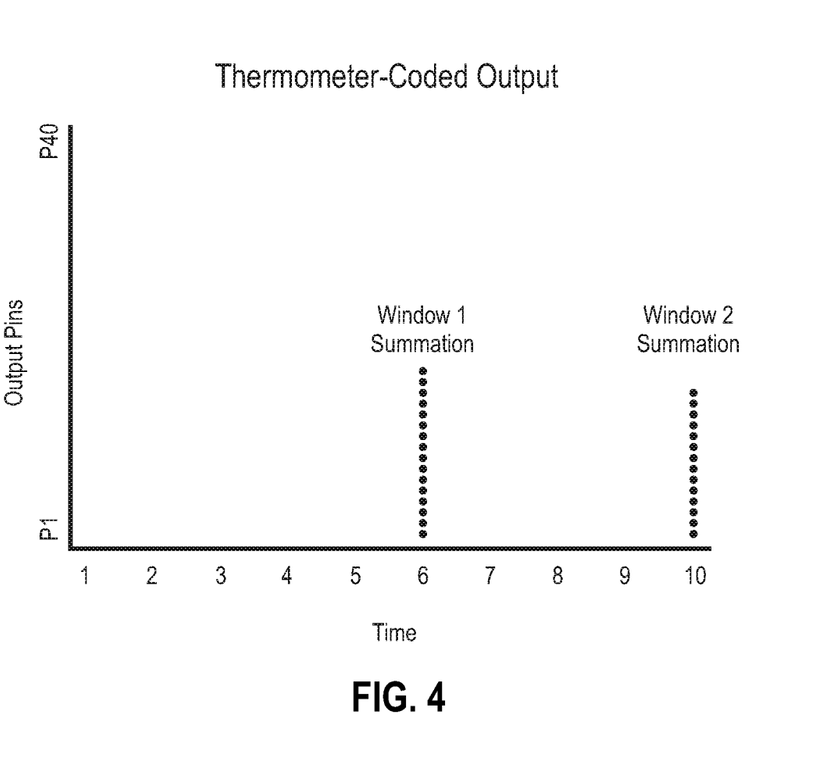
FIG. 4 depicts an example of two thermometer codes according to embodiments of the present disclosure.

Referring to FIG. 4, an example of two thermometer codes is provided. In this example, the population-code to thermometer-code converter corelet produces two thermometer codes, one at tick 6 and one at tick 10.

A population code P with domain $D_n = \{1, \ldots, n\}$ is any function $P: D_n \rightarrow \{0,1\}$.

A population code refers to any set of spikes that may enter a corelet input connector in the same tick. For any sequence of population codes $P_1: D_n, \ldots, P_t: D_n$ that enter a corelet's input connector over a sequence of t consecutive ticks, there exists a unique thermometer code $T: D_{n*t} \rightarrow \{0,1\}$ that can represent, in a single tick, the exact same number of input spikes that enter the corelet. The value v represented by any population or thermometer code $P: D_n \rightarrow \{0,1\}$ at a single time-instant/tick is given by Equation 1.

$$v = \Sigma_{i=1,\ldots,n} P(i) \qquad \text{Equation 1}$$

Given two thermometer codes $T: D_n \rightarrow \{0,1\}$ and $S: D_m\{0,1\}$, S is referred to as a sub-thermometer code of T if there exists some i in set $\{1, \ldots, n\}$ such that for all j in set $\{i, i+1, i+2, \ldots, i+m-1\} T(j)=S(j-i+1)$.

In other words, a sub-thermometer code can be thought of as a thermometer code representation of the input spikes entering via some subinterval of input pins in a corelet's input connector.

Given a thermometer code $T: D_n \rightarrow \{0,1\}$, a discretization of this thermometer code consists of any set of sub-thermometer codes $\{S_1, S_2, \ldots, S_d\}$ where $S_j: D_m \rightarrow \{0,1\}$ for all $j \in \{1, \ldots, d\}$ and satisfy the following condition: For every $i=1, \ldots, n$ in the domain of T if $(j-1)*m+k=i$ for some j in $\{1, \ldots, d\}$ and k in $\{1, \ldots, m\}$, then $T(i)=S_j(k)$.

In other words the sub-thermometer codes split any thermometer code T into a set of juxtaposed sub-thermometer codes which in unison can be used to define the function T For ease of exposition, the above assumes that each of the sub-thermometer codes has a domain of the same cardinality. However this assumption is not necessary for the embodiments provided herein.

Figure 5A:
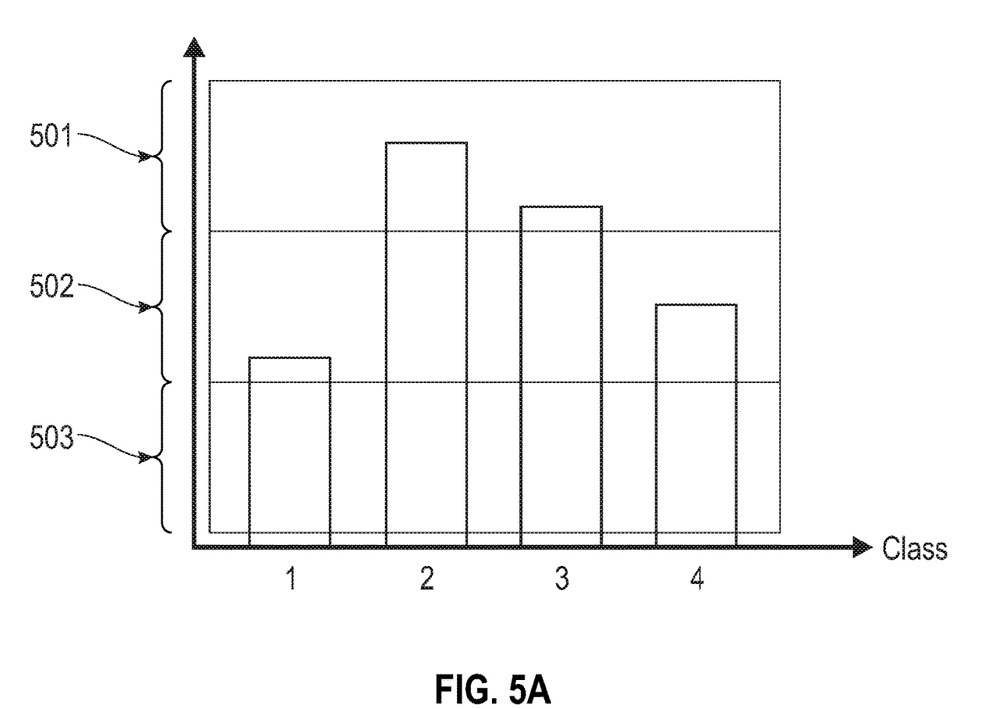
FIG. 5A illustrates four thermometer codes according to embodiments of the present disclosure
Figure 5B:
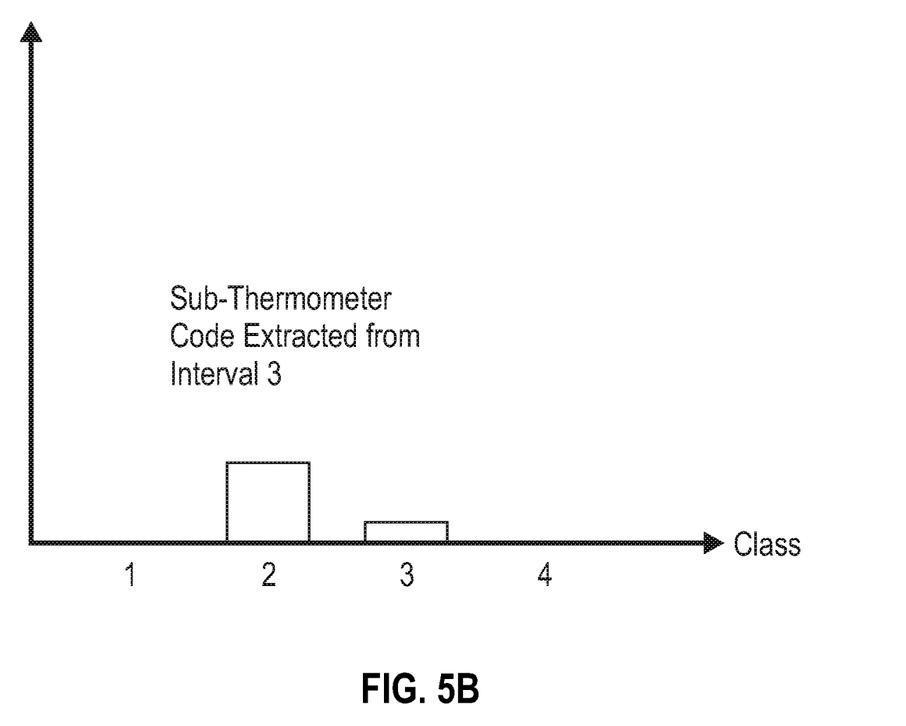
FIG. 5B illustrates a sub-thermometer code extracted from an interval of FIG. 5A according to embodiments of the present disclosure.

Referring to FIG. 5A, four thermometer codes, corresponding to 4 different classes, are illustrated. A possible discretization into 3 sub-thermometer codes is also illustrated, as denoted by the corresponding intervals 501 . . . 503. In FIG. 5B, the sub-thermometer code extracted from interval 501 is illustrated. Given a thermometer code T: $D_n \rightarrow \{0,1\}$, the peak of this thermometer code is the largest value of i such that $T(i)=1$.

Given a set of c thermometer codes $T_1: D_n \rightarrow \{0,1\}$, $T_2: D_n \rightarrow \{0,1\}, \ldots T_c: D_n \rightarrow \{0,1\}$, the winner take all problem consists of finding any one index i in $\{1, \ldots, c\}$ such that the peak of $T_i$ is at least as large as the peaks of all other thermometer codes $\{T_1, \ldots, T_c\} - \{T_i\}$.

As it is possible for many thermometer codes to have the same peak value, the WTA problem may be solved by finding any one of the indices i containing the peak/global maximum. Referring back to FIG. 5B, it will be apparent that application of a WTA to the sub-thermomemeter code corresponding to interval 501, results in the same WTA solution (class 2) as the WTA solution of the original thermometer codes.

For any positive integers d, m, c, let $U_k = \{S_1^k, \ldots, S_d^k\}$ define a discretization of a thermometer code $T_k: D_n$ where k can take any value in $\{1, \ldots, c\}$. In other words, the set $\{U_1, \ldots U_c\}$ represents a discretization into d intervals of identical length m per interval, of a set of c thermometer codes. Then the solution to the winner-take-all problem for any thermometer codes $T_1, \ldots, T_c$ is equivalent to the problem of finding the solution of the winner take all problem for thermometer codes $\{S_o^1, S_o^2, \ldots, S_o^c\}$ where o is the value in $\{1, \ldots, d\}$ such that if p is the peak index corresponding to a solution to the winner take all problem of thermometer codes $\{T_1, \ldots, T_c\}$ then p lies in the interval $[(o-1)*m+1, o*m]$.

The above proposition may be proved as follows. Consider the case where $c=2$, and the two thermometer codes $T_1$, $T_2$ represent the values 7 and 6 respectively (i.e., $T_1(i)=1$ for $i \leq 7$, $T_1(i)=0$ for $i>7$, $T_2(i)=1$ for $i \leq 6$ and $T_2(i)=0$ for $i>6$. Also assume that two sub-thermometer codes are used representing the intervals [1,5] and [6,10] respectively (i.e., $S_1^1(i)=1$ for $i=1, \ldots, 5$, $S_1^2(i)=1$ for $i=1, \ldots, 5$, $S_2^1(i)=1$ for $i \leq 2$ and $S_2^1(i)=0$ for $i=3,4,5$, $S_2^2(i)=1$ for $i=1$, $S_2^2(i)=0$ for $i=2,3,4,5$.). The peak of $T_1$ is 7 and the peak of $T_2$ is 6, and thus 7 is the peak index corresponding to the WTA solution (class 1) of the thermometer codes $T_1, T_2$. This peak lies in the second interval which overlaps the two sub-thermometer codes $S_2^1$, $S_2^2$. But the WTA solution of thermometer codes $S_2^1$, $S_2^2$ is index 1 which is the same as the WTA solution of $T_1, T_2$.

If the size m of each one of these subintervals is sufficiently small, and the number of classes c is also sufficiently small, solving the WTA problems for the corresponding sub-thermometer codes is straightforward on TrueNorth, as it simply involves comparing every class thermometer code with the other class thermometer codes and declaring as a winner any class which has a thermometer code that is at least as large as all the other thermometer codes. In the case of TrueNorth, this is accomplished by having two axon types with weights 1 and −1. Each core takes as input m axons per each one of the c classes, where c−1 of the class axons have a weight of −1 and the other one remaining class's axons have a weight of 1. With c−1 neurons allocated per core, each neuron takes one of the c−1 class values with −1 weight as input, and subtracts its value from the values carried by the m axons mapping to synapses with weight of 1. A single output spike is produced if the values are at least equal to zero. If all c−1 neurons produce a spike the class whose values mapped to axons with synaptic weight 1 are declared as the winning class with the largest value (a logical AND gate with c−1 inputs can merge the outputs of the c−1 neurons).

In the degenerate case where all c class values are equal, selecting any one of the classes as the winner satisfies the definition of the winner take all. Thus, as long as c*m is a bit less than 256 this calculation can fit on a single True-North core (typically a few axons per core are used for control signals). This may be referred to as an argmax operation in that it takes an ordered set of numbers as input and outputs an indicator of which number has the largest value. By flipping the synaptic weights an argmin operation can also be created, which again takes an ordered set of numbers/spikes as input and outputs an indicator of which of these numbers has the smallest value.

If m were a number in the thousands or hundreds of thousands the above algorithm could not be implemented in a single TrueNorth core due to the 256 axon constraint. While a rate code could be used to minimize the number of axons used per class, this would come at the expense of the number of ticks needed to complete the calculcation. In the extreme case where m is in the thousands and an output once per tick is required, it is apparent that there is no straight-forward solution to the problem that does not involve heavy use of demultiplexing. In other words, the problems of WTA for high dynamic ranges is now reduced to the problem of determining the sub-thermometer code interval containing the peak of the thermometer code that is the WTA winner, and then passing the corresponding subset of the data to a WTA mechanism that is suitable for low-dynamic range data.

Take, for example, the case with positive integers d, m, c, thermometer codes $T_1, \ldots, T_c$ and discretizations $U_1, \ldots, U_c$. Let $v_{j,k}$ denote the summation of all spikes/values in $S_j^k$. In other words, as given by Equation 2.

$$v_{j,k} = \Sigma_{l=1, \ldots, m} S_j^k(i)$$    Equation 2

Furthermore let $u_j = \max\{v_{j,1}, v_{j,2}, \ldots, v_{j,c}\}$. Let the indicator function $I(j,k)$ take the value of 1 if and only if $v_{j,k} - u_j \geq 0$ and otherwise $1(j,k)=0$. Then the smallest index j which minimizes Equation 3 corresponds to a sub-thermometer interval j such that any winner take all solution of $S_j^1$, $S_j^2, \ldots, S_j^c$ is included in the set of potential winner take all solutions for $T_1, \ldots, T_c$.

$$\Sigma_{k=1, \ldots, c} I(j,k)$$    Equation 3

The above may be proved by induction on all interval values d and all class numbers c, as follows. Define the predicate P(d,c) as true if and only if the smallest index j from $\{1, \ldots, d\}$ which minimizes $\Sigma_{k=1, \ldots, c} I(j,k)$ corresponds to a sub-thermometer interval j such that any winner take all solution of thermometer codes $S_j^1 S_j^2, \ldots, S_j^c$ is included in the set of potential winner take solutions for $T_1, \ldots, T_c$.

In the base case, P(1,c) holds for all values of c (i.e., all the possible number of classes). This is true because thermometer codes $S_1^1, S_1^2, \ldots, S_1^c$ are identical to thermometer codes $T_1, \ldots, T_c$.

In the inductive step, P(d,c) is assumed to hold for all values of c. It is shown that P(d+1,c) also holds for all values of c. Assume that the winning thermometer code does not achieve its peak in the top interval d+1. This implies that for the topmost interval d+1 any sub-thermometer code assumes a value of 0, which means that the maximum possible value is shown in Equation 4.

$$\Sigma_{k=1, \ldots, c} I(d+1,k) = c$$    Equation 4

Now consider the thermometer codes $T'_1, \ldots, T'_c$ which exclude this top interval d+1 but include intervals $1, \ldots, d$. By the inductive hypothesis there is some index j in $\{1, \ldots, d\}$ which specifies a sub-thermometer code interval whose WTA solution is contained in the WTA solution of $T'_1, \ldots, T'_c$. But since $\Sigma_{k=1, \ldots, c} I(d+1, k) = c$ (the maximum possible value) and the WTA solution of $T_1, \ldots, T_c$ is identical to the WTA solution of $T'_1, \ldots T'_c$ this index j is equal to the smallest index j' in $\{1, \ldots, d+1\}$ which minimizes Equation 5 such that the WTA solution of $S'_j{}^1, S'_j{}^2, \ldots, S'_j{}^c$ is included in the set of potential winner take solutions for $T_1, \ldots, T_c$.

$$\Sigma_{k=1, \ldots, c} I(j',k)$$    Equation 5

Conversely, assume that the winning thermometer code $T_i$ achieves its peak in the top interval d+1. This means that in all other intervals $1, \ldots, d$ the corresponding sub-thermometer codes of $T_i$ assume a value of 1 in their entire domain (the maximum possible value), implying that class i is also a winner amongst the thermometer codes consisting of the union of intervals $\{1, \ldots, d\}$ (call them $T'_1, \ldots, T'_c$). Thus, by the inductive hypothesis the smallest index j in $\{1, \ldots, d\}$ which minimizes $\Sigma_{k=1, \ldots, c} I(j,k)$ corresponds to a sub-thermometer interval j such that i is amongst its winner take all solutions and is included in the set of potential winner take solutions for $T'_1, \ldots, T'_c$. But then on account of the fact that interval d+1 contains a peak induced by thermometer code i (i.e., no other thermometer code has a higher peak), we see that $\Sigma_{k=1, \ldots, c} I(d+1, k) \leq \Sigma_{k=1, \ldots, c} I(j,k)$ and the winner take all solutions for both intervals d+1 and j contain class i as a winner. If $\Sigma_{k=1, \ldots, c} I(d+1, k) = \Sigma_{k=1, \ldots, c} I(j,k)$ and since j<d+1 then j is the smallest index from $\{1, \ldots, d+1\}$ which minimizes $\Sigma_{k=1, \ldots, c} I(j,k)$ such that the WTA solution of $S_j^1, S_j^2, \ldots, S_j^c$ is included in the set of potential winner take solutions for $T_1, \ldots, T_c$. We also see that if $\Sigma_{k=1, \ldots, c} I(d+1, k) < \Sigma_{k=1, \ldots, c} I(j,k)$ then interval d+1 is the first interval achieving a value that is at most $\Sigma_{k=1, \ldots, c} I(d+1, k)$ while at the same time satisfying the condition that the WTA solution of $S_{d+1}^1, S_{d+1}^2, \ldots, S_{d+1}^c$ is also equal to i, the WTA solution of $T_1, \ldots, T_c$.

The above discussion demonstrates the correctness of the high-dynamic range WTA mechanism described herein. Below, the implementation details are provided for an exemplary embodiment based on TrueNorth that finds the smallest index j in $\{1, \ldots, d\}$ that minimizes $\Sigma_{k=1, \ldots, c} I(j,k)$. Using this TrueNorth compatible mechanism, the corresponding sub-thermometer codes of interval j can be passed as input to the WTA mechanism described previously, which is suitable for low-dynamic range inputs, and can find the winning class.

Alternatively, a less computationally expensive option is to consider the output of this interval j, given by the binary sequence $I(j,1), \ldots, I(j,c)$ as a population code. Any index i, where $I(j,i)=1$, constitutes a class that is equal to the global maximum. To guarantee that a single spike representing the winning class is output, another corelet can be used that finds the first index/pin in the population code where an output spike is produced and outputs a single spike for that output pin. This provides for a form of a low-dynamic-range WTA where each input can produce at most one spike.

Given multiple thermometer codes $T_1, \ldots, T_c$. as input, a splitter can be used to duplicate each of the d consecutive length m subintervals of each of the c input thermometer codes. This gives 2*d*c sets of connector outputs, each connector output with m pins. In some embodiments, one TrueNorth crossbar is allocated per interval, for a total of d crossbars. In some embodiments, each TrueNorth crossbar has 256 axons. In some embodiments, c+1 groups of m axons each are allocated, for a total of (c+1)*m axons per TrueNorth core. This allocation must satisfy (c+1)*m≤256. In some embodiments, m=16, c=15 for example. This sets an upper bound on the number of classes that can be used. According to embodiments discussed below, this upper bound on the number of classes is exceeded.

The first c of these axon groups in crossbar number i take as input the $i^{th}$ sub-interval of the corresponding sub-thermometer codes. At the same time, group c+1 of the axons on the crossbar takes as input through a busor operation the second copy of all these axon groups that were entered via the first c*m pins. Effectively the $i^{th}$ pin of the c+1$^{th}$ group takes as input at the same time all spikes that entered the $i^{th}$ pin of the first c groups. This merging onto the same axon of spikes generated by multiple neurons is referred to as a busor operation, and is logically equivalent to the application of a logical OR operation at each tick, where a spike enters the neuron's axon at each tick if at least one of the inputs that are merged on the single axon contains a spike (equivalent to a logical value of 1). Because the inputs of all these first c groups are thermometer codes, the resultant input in the c+1$^{th}$ group is the maximum value of all these thermometer codes. So, if c=2 for example, and 2 spikes enter the first group of axons, and 4 spikes enter the second group of axons, then group 3 takes thermometer code value 4 as input which is the busor of a 2-spike thermometer code and a 4-spike thermometer code. In some embodiments, c output neurons are associated per crossbar, which simulate for k=1, . . . , c, the indicator function I(j,k) previously described (assuming that it is the $j^{th}$ sub-thermometer code that entered the core). In the above example, the first output neuron produces a single spike if the value of the spikes that entered via the first axon group (value 2) is greater than or equal to the max group (value 4), which is false in this case. Similarly, the second neuron produces an output spike if the second axon group input (value 4) was greater than or equal to the max group (value 4) which is true. So, for the above example the crossbar would produce 1 output spike for class 2, the global winner. The TrueNorth neuron parameters that achieve this consist of an alpha ($\alpha$) value of 1, a positive leak of 1, a +1 synapse weight for the first c*m set of weights (represented by the values $v_{j,1}, \ldots, v_{j,c}$ in the above proofs) and a synapse weight of −1 for the busor input consisting of m weights (represented by $u_j$ in the above description). A control axon with a large negative weight can be used to suppress output spikes if we wish to, during a particular tick.

Each of the above d TrueNorth crossbars gives a population code of length c. These population codes are sent to a low-dynamic range argmin operator which in turn indicates the first of the intervals in {1, . . . , d} that has the smallest value. By the above theorem it is apparent that it now suffices to apply a WTA/argmax operation on the sub-thermometer code corresponding to this winning interval. Alternatively, and as indicated previously, it also suffices to find the first index i where I(j,i)=1 and return a binary code of length c where only index i has a spike, thus representing the winning class. This may be implemented by searching for a contiguous list of pins, starting from pin 1 and spanning to some pin i<c, where pin i produces an output spike if (a) there are zero spikes in pins 1 to i−1 (which may be implemented via a simple summation in a TrueNorth core, with synaptic weights of −1, a positive leak of +1 and spiking threshold of 1, that outputs a spike if and only if there were no input spikes) and (b) there is at least one spike in pins 1 to i (implemented by a simple OR operation). This may be implemented by two neurons responsible for operations (a) and (b) whose outputs are logically ANDed by a third neuron.

In the above discussion, constraints are assigned as to how large the number of classes c is. Given a large number of classes, this limitation may be circumvented by applying multiple high dynamic range WTA algorithms on multiple distinct non-overlapping sets of thermometer codes for different subsets of classes. Then, in the second layer, another WTA is applied on the winners of the previous layer, which is repeated recursively until the global winner is determined.

As described above, the first operation the corelet performs is to convert an arbitrary sequence of population codes, into a single-tick thermometer code. This is needed for example to interpret an exemplary backpropagation algorithm's output, which follows this format.

Figure 6:
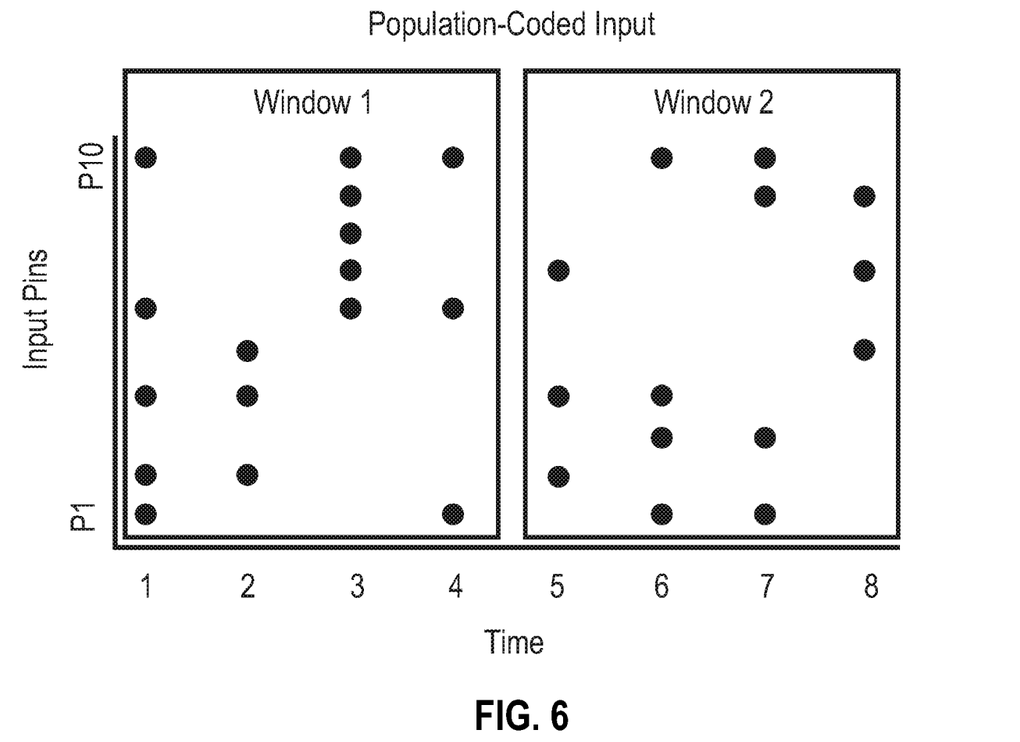
FIG. 6 depicts exemplary input sequences of population codes according to embodiments of the present disclosure.

Referring now to FIG. 6, an example of sequences of population codes produced over two time windows of length 4 each (inputWidth=4, numInputs=10) are provided. Each window's population code is summed into a thermometer code with 16 and 14 spikes respectively, as illustrated in FIG. 4. In some embodiments, a corelet takes some number of population coded inputs (numInputs), sums them across some period of time (inputWidth), and generates a thermometer coded output of size numInputs*inputWidth (numOutputs).

In some embodiment, the number of neurons needed to generate the population coded output, named numOutputs, is computed to be (numInputs*inputWidth). Each consecutive output neuron is configured with a threshold of one higher than its predecessor, starting with a threshold of 1 for the first output neuron as given in Equation 6.

$$\alpha_1=1, \alpha_2=2, \alpha_3=3, \alpha_4=4, \ldots, \alpha_{numOutputs}=\text{numOutputs} \quad \text{Equation 6}$$

Additionally, to insure that no neuron spikes prior to the end of the input window, each neuron's threshold is increased by numOutputs (e.g., as shown in Equation 7.

$$a_1 = 1 + numOutputs \quad \text{Equation 7}$$
$$\alpha_2 = 2 + numOutputs$$
$$\alpha_3 = 3 + numOutputs$$
$$\alpha_4 = 4 + numOutputs$$
$$\ldots$$
$$\alpha_{numOutputs} = numOutputs + numOutputs$$

Over the course of the defined input window, neurons receive input spikes with a weight of 1, increasing their membrane potential accordingly. On the last tick of the input window, an additional input spike with a weight of numOutputs is generated by a periodic neuron (a linear neuron with a positive leak of 1 and a threshold of inputWidth) is sent to each of the output neurons. This causes each neuron's membrane potential to increase by numOutputs. In doing so, any output neuron which received at least its (α-numOutputs) input spikes will generate an output spike.

For example, consider the case where there are 10 inputs and an input width of 4. There will be 40 output neurons with thresholds ranging from 41 ($n_1$) to 80 ($n_{40}$). At the start of an input frame, each neuron has a membrane potential of 0. Over the course of an input window, 10 input spikes are received, resulting in each neuron having a membrane potential of 10 (all well below their thresholds). On the last tick of the window, an additional spike from a periodic neuron increases the membrane potential of each neuron by numOutputs, which results in $n_1$ through $n_{10}$ exceeding their threshold and each generating an output spike. As no other output neurons have exceeded their thresholds, they will not spike. On the tick following the output generation, an additional periodic neuron sends a spike with a weight of −255 to each of the output neurons, resulting in their membrane potentials all going to 0.

As described above, the population code summing corelet is able to collect input over the course inputWidth window, produce a result on the inputWidth+$1^{th}$ tick, reset its state on the inputWidth+$2^{th}$ tick, and finally begin processing new input on the inputWidth+$3^{th}$ tick. This means that any input which arrives between ticks inputWidth+1 and inputWidth+3 will not be properly processed by this corelet. In some embodiments, however, this input needs to be processed.

To avoid this loss, the network is redesigned slightly in some embodiments. Instead of a single population code summing corelet, a new network is created which consists of a splitter corelet and two population code summing corelets. The splitter is responsible for sending all input spikes to both summing corelets. The summing corelets are identical with the exception that the timing signals for the second one are inputWidth ticks out of phase with the first one, allowing it to process input signals while the first one is generating output and resetting itself and vice versa. Additionally, because these corelets will be receiving input spikes while they are resetting and will potentially accumulate potential, each corelet's input phase is started with a reset pulse to ensure their membrane potential at the start of each input phase is 0.

Figure 7:
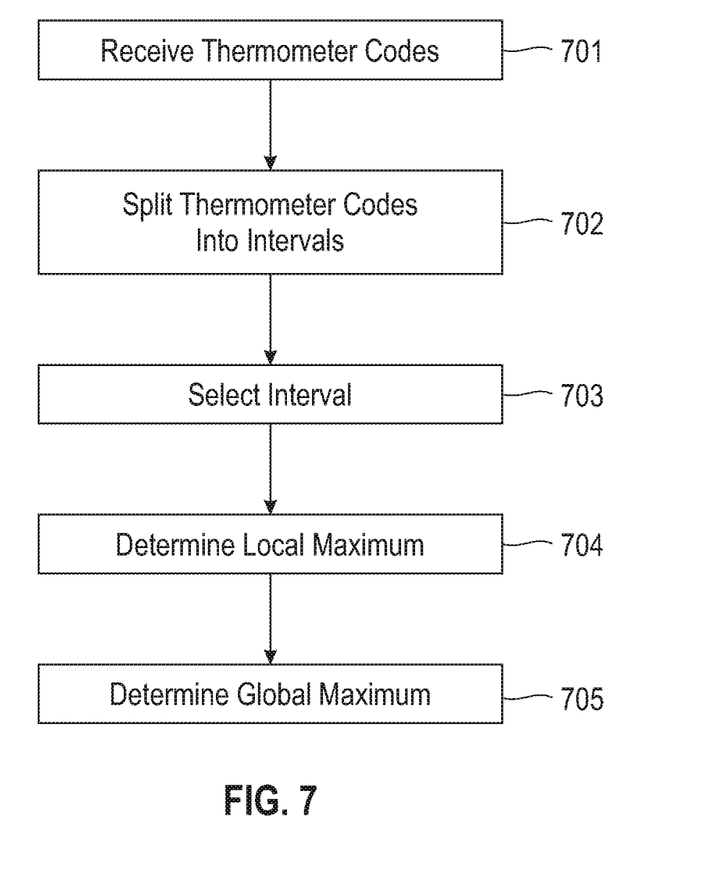
FIG. 7 illustrates a method for winner-take-all according to embodiments of the present disclosure.

Referring now to FIG. 7, a method for winner take all according to embodiments of the present disclosure is illustrated. At 701, a plurality of thermometer codes are received by a neurosynaptic core. At 702, the plurality of thermometer codes is split into a plurality of intervals. In some embodiments, the plurality of intervals have equal heights. In some embodiments, multiple copies of the sub-thermometer codes of each interval are created. In some such embodiments, two copies are made. At 703, one of the plurality of intervals is selected. In some embodiments, the one interval is selected by distributing the multiple copies multiple crossbars, one crossbar per interval. In some embodiments, each crossbar computes the indicator function I(j,k). In some embodiments, a low dynamic range argmin corelet is applied to find which of the outputs of the indicator function has the smallest number of spikes, and therefore represents a peak. In some embodiments, a gating corelet is applied to let through the output of the crossbar corresponding to the peak interval. At 704, a local maximum is determined within the one of the plurality of intervals. In some embodiments, the local maximum is determined by application of a first spike corelet that indicates the first pin where a spike occurs. At 705, a global maximum is determined based on the local maximum. In some embodiments, the local maximum is accepted as the global maximum. In other embodiments, the global maximum is determined by repeating the above process for multiple subsets of thermometer codes and then merging those winning thermometer codes via another winner-take-all operation, hierarchically repeating this process until a single winning class has been determined.

Embodiments according to the present disclosure are advantageous in various applications. Embodiments of the present disclosure provide a tool facilitating the programming of neuromorphic hardware whenever a winner take all operation is needed. In particular, as the need for high dynamic range capable WTA mechanisms emerges in spiking neural networks, due to the ever-increasing size of the number of classes associated with object recognition systems, for example, WTA mechanisms according to embodiments of the present disclosure will become indispensable. For example, whenever a subsystem of a neuromorphic system needs a WTA/argmax/argmin operation (such as for action selection or object class determination) in order to control the behavior of another neuromorphic subsystem, WTA algorithms according to embodiments of the present disclosure can be used.

Heterogeneous or hybrid computing is closely related to the problem of facilitating the interaction amongst vastly different architectures. The present disclosure enhances the programming paradigm and the interoperation of hybrid systems by providing a solution to the problem of reducing the high output spike rates associated with many neuromorphic systems, by condensing their output to a single output spike per frame.

Figure 8:
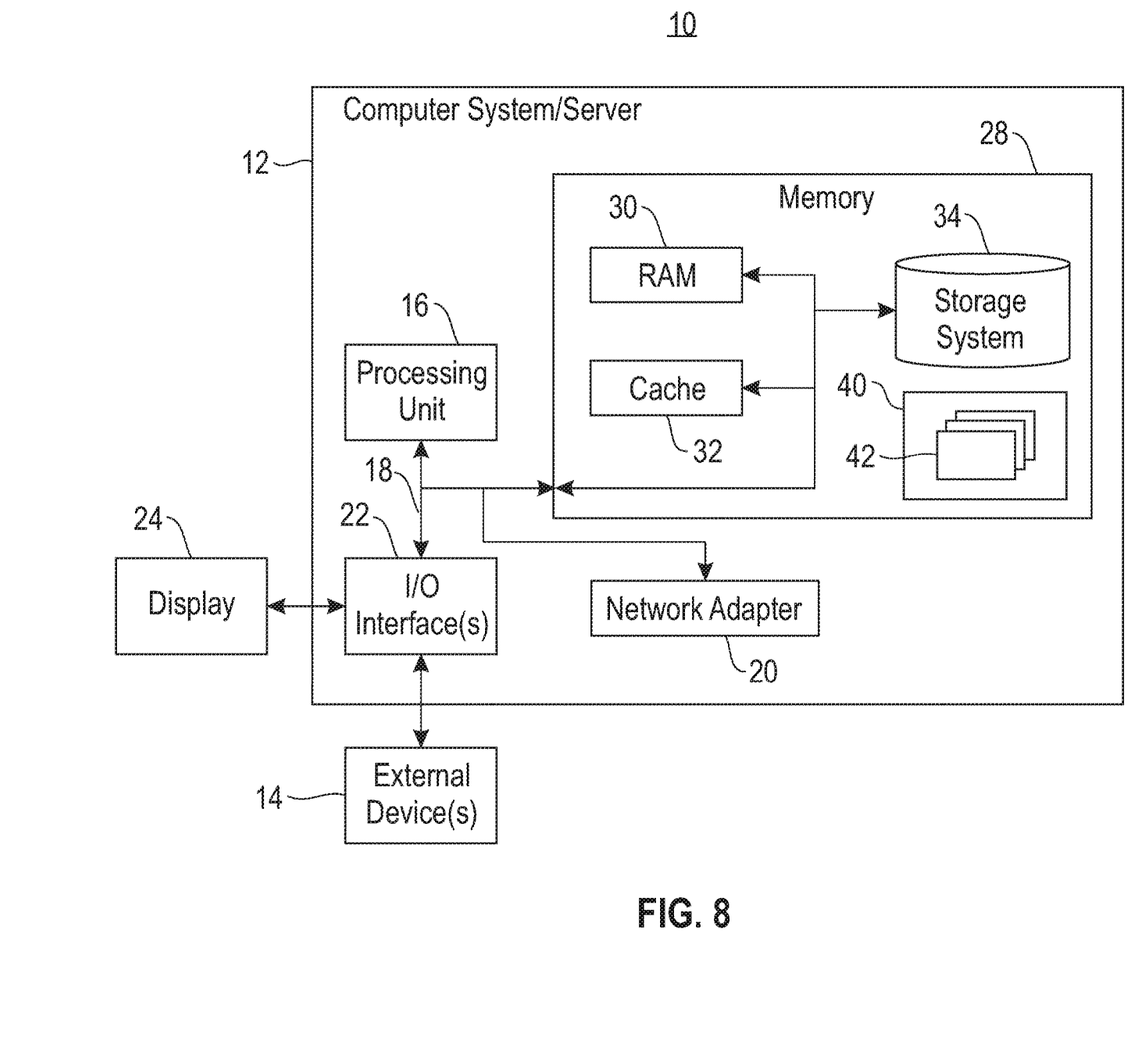
FIG. 8 depicts a computing node according to an embodiment of the present invention.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a plurality of thermometer codes by a neurosynaptic core, the neurosynaptic core comprising a plurality of input pins;
splitting the plurality of thermometer codes into a plurality of contiguous intervals, each of the plurality of contiguous intervals comprising sub-thermometer codes of the plurality of thermometer codes, the sub-thermometer codes representing the input spikes received via a subinterval of the plurality of input pins;
selecting one of the plurality of intervals;
determining a local maximum of the sub-thermometer codes within the one of the plurality of intervals;
determining a global maximum of the plurality of thermometer codes based on the local maximum.

2. The method of claim 1, further comprising:
receiving a population code;
converting the population code to the plurality of thermometer codes.

3. The method of claim 2, wherein the population code is received at a rate substantially the same as the plurality of thermometer codes are output.

4. The method of claim 1, wherein the selected one of the plurality of intervals has a lower dynamic range than the plurality of thermometer codes.

5. The method of claim 1, wherein the one of the plurality of intervals contains the global maximum.

6. The method of claim 1, further comprising:
determining a winning class from the global maximum.

7. The method of claim 6, further comprising:
outputting an indication of the winning class.

8. The method of claim 7, wherein the plurality of thermometer codes are received at a rate substantially the same as the indication of the winning class is output.

9. The method of claim 1, wherein determining the global maximum based on the local maximum comprises:
receiving a second local maximum from a second neurosynaptic core; and
determining the global maximum based on the second local maximum.

10. The method of claim 1, wherein each of the plurality of thermometer codes corresponds to a class.

11. A system comprising a plurality of neurosynaptic cores, each of the plurality of neurosynaptic cores comprising a plurality of input pins, the system configured to execute:
a first corelet, the first corelet adapted to
receive a plurality of thermometer codes,
split the plurality of thermometer codes into a plurality of contiguous intervals, each of the plurality of contiguous intervals comprising sub-thermometer codes of the plurality of thermometer codes, the sub-thermometer codes representing input spikes received via a subinterval of the plurality of input pins of one of the plurality of neurosynaptic cores, and select one of the plurality of intervals;

a second corelet, the second corelet adapted to
receive the one of the plurality of intervals,
determine a local maximum of the sub-thermometer codes within the one of the plurality of intervals, and
determine a global maximum of the plurality of thermometer codes based on the local maximum.

12. The system of claim 11, further configured to execute:
a third corelet, the third corelet adapted to
receive a population code, and
convert the population code to the plurality of thermometer codes.

13. The system of claim 12, wherein the population code is received by the third corelet at a rate substantially the same as the plurality of thermometer codes are output.

14. The system of claim 11, wherein the selected one of the plurality of intervals has a lower dynamic range than the plurality of thermometer codes.

15. The system of claim 11, wherein the one of the plurality of intervals contains the global maximum.

16. The system of claim 11, wherein the second corelet is further adapted to determine a winning class from the global maximum.

17. The system of claim 16, wherein the second corelet is further adapted to output an indication of the winning class.

18. The system of claim 17, wherein the plurality of thermometer codes are received by the first corelet at a rate substantially the same as the indication of the winning class is output.

19. The system of claim 11, wherein determining the global maximum based on the local maximum comprises:
receiving a second local maximum; and
determining the global maximum based on the second local maximum.

20. The system of claim 11, wherein each of the plurality of thermometer codes corresponds to a class.

* * * * *